K. W. BARTLETT.
LIQUID MEASURING APPARATUS.
APPLICATION FILED NOV. 20, 1908.

1,037,413.

Patented Sept. 3, 1912.

Witnesses

Inventor
Kent W. Bartlett
By G. L. Cragg
Attorney

UNITED STATES PATENT OFFICE.

KENT W. BARTLETT, OF MADISON, WISCONSIN, ASSIGNOR TO NORTHERN WATER SOFTENER COMPANY, A CORPORATION OF MAINE.

LIQUID-MEASURING APPARATUS.

1,037,413.  Specification of Letters Patent.  Patented Sept. 3, 1912.

Application filed November 20, 1908. Serial No. 463,729.

*To all whom it may concern:*

Be it known that I, KENT W. BARTLETT, citizen of the United States, residing at Madison, in the county of Dane and State of Wisconsin, have invented a certain new and useful Improvement in Liquid-Measuring Apparatus, of which the following is a full, clear, concise, and exact description, reference being had to the accompanying drawings, forming a part of this specification.

My invention relates to apparatus for controlling the flow of fluids and has been used in connection with water softening outfits.

My invention will be readily understood from the description of the preferred embodiment thereof, shown in the accompanying drawings, in which—

Figure 1:
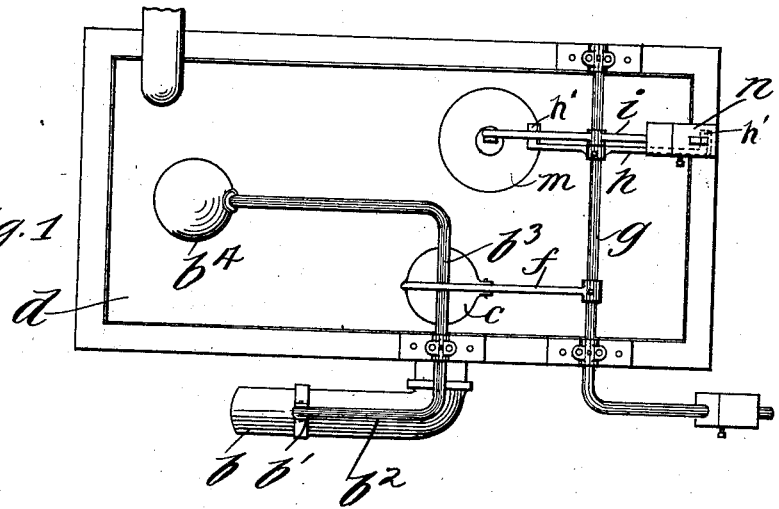
Figure 2:
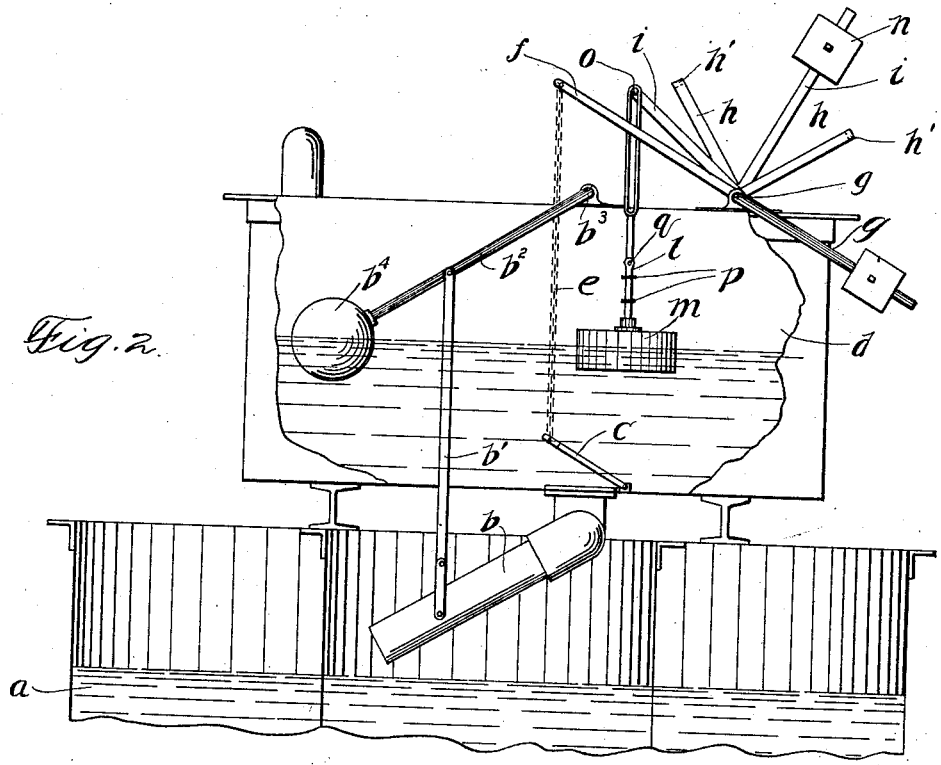

Figure 1 is a plan view of apparatus constructed in accordance with the invention and Fig. 2 is a view in elevation, certain parts being broken away, of the apparatus illustrated in Fig. 1, a measuring tank being added.

Like parts are indicated by similar characters of reference throughout the different figures.

The water that is to be measured is admitted to a measuring tank $a$ through a pipe $b$ adapted to be lowered or raised for the purpose of permitting flow of water therethrough under constant head. As a source of supply from which the water is furnished to the measuring tank, I have indicated a tank $d$, through the bottom of which the stationary end of the pipe $b$ desirably projects. The swinging section of the pipe $b$ is connected with one end of the connection $b^1$, the other end of said connection being attached to the free end of a swinging arm $b^2$. The arm $b^2$ carrying the connection $b^1$ is fixed with respect to a rotating rod $b^3$ that supports a float $b^4$ that is supported by the fluid in the supply tank $d$. As the level of the fluid in the supply tank varies, the position of the float $b^4$ varies, thereby effecting corresponding movement of the rod $b^3$ and corresponding movement of the discharge pipe $b$, so that the liquid being discharged through the pipe $b$ flows therethrough under uniform head. The pipe $b$ is provided with a valve $c$ adapted to be widely opened or completely closed for the purpose of permitting a full flow of water through the pipe $b$ or for cutting off this flow entirely. The valve is desirably hinged along one side and is connected with one end of the chain $e$ at the opposite side, the other end of said chain being attached to the free end of an arm $f$ that is fixed upon a rotatable rod $g$. When the rod $g$ is rotated in one direction, the valve $c$ is lifted, thereby to permit the full flow of water through the pipe $b$ into the receiving tank $a$, and when said rod $g$ is rotated in the opposite direction, the chain $e$ is permitted to slacken, whereupon the valve $c$ will close through the joint action of gravity and suction. The rod $g$ is automatically rotated in both directions by means of the mechanism illustrated, which includes an arm $h$ fixed upon the rod $g$, an arm $i$ rotatable upon the rod $g$, a vertical rod $l$ having pin and slot connection at its upper end with the arm $i$, and a float $m$ provided at the lower end of said rod $l$ and riding upon the water in the supply tank $d$. The arm $h$ is somewhat in the form of a bell-crank lever and is fixed upon the shaft $g$ at its elbow. When the water in the supply tank is receding toward its lower level, the float $m$ is correspondingly lowered, thereby to swing the right-hand weighted end of the arm $i$, which is also in the form of a bell-crank journaled upon the shaft $g$ at its elbow, toward the rod $l$ sufficiently to carry the right-hand end of the arm $i$ in this movement just beyond the vertical, whereupon said arm $i$, being adjustably weighted at $n$, will drop forcibly to strike the end of the arm $h$ that is nearer the rod $l$, whereby the arm $h$ will be rotated in a manner to have the end thereof adjacent to the rod $l$ move downwardly, said arm $h$ in this movement rotating the rod $g$ so as to lower the arm $f$ and thereby permit the valve $c$ to close, so as to cut off the flow of water through the pipe $b$. The arm $i$ falls in order thus to shut off the flow of water from the supply tank $d$ to the measuring tank $a$ when the water in the supply tank has reached its lowermost level. As the water in the supply tank rises, the slotted upper end of the rod $l$ rises, the bottom of the slot engaging the pin $o$ carried by the arm $i$, thereby to rotate the arm $i$ upon and with respect to the shaft $g$. Continued upward movement of the float $m$ takes part in effecting the return movement of the arm $i$, the movement of the arm $i$ by the rod $l$ continuing until the weighted end of said arm just passes the vertical, whereupon said arm $i$ will fall into engagement with that end of the arm $h$ more remote from the rod $l$, thereby occasioning a rotation of the rod or shaft $g$ opposite to that which was previously secured, whereupon the arm $f$ is raised and the chain $e$ is lifted so that the valve $c$ is opened to permit of the full flow of water through the pipe $b$. The falling movement of the arm $i$ that causes the chain $e$ to be lifted occurs when the water in the supply-tank has reached its upper level, the float continuing to be supported by the water in the measuring tank inasmuch as the arm $i$ in falling to elevate the valve $c$, has relative movement with respect to the rod $l$, in that the pin $o$ carried by the arm $i$ rises in the slot in the upper end of said rod $l$, there thus being lost motion between the float and the arm $i$.

The arm $h$, in order that it may be engaged by the weighted arm $i$, is desirably provided with transversely extending fingers $h^1$ that lie across the plane of movement of the arm $i$. The rod $l$ desirably passes through two guides $p$ near the lower end of the rod, which serve to direct the float $m$ in vertical movement. Said rod $l$, owing to its pin and slot connection with the rod $h$, is desirably formed in two sections that are flexibly united at $q$, so that the upper portion of the rod $l$ may depart slightly from the vertical as said rod $l$ is shifted by the movement of the float $m$.

The apparatus shown is of particular service in connection with liquid treating apparatus, though I do not wish to be limited to this use of the apparatus. By means of the apparatus shown and described, fluid which may be received within the tank $d$ at varying rates is supplied from said tank to the measuring tank $a$ under uniform pressure and at a regular rate of flow, mechanism of my invention preventing flow of water from the supply tank $d$ to the measuring tank $a$ until sufficient quantity of water has been received within the supply tank $d$, whereby the water is added to the measuring tank $a$ in fixed quantities, a result highly useful in apparatus employed in softening water where water is received from a prime source at an irregular rate, the prime source being the source from which the supply tank $d$ gets its supply. Means for supplying fixed quantities of chemical are now so well known by those skilled in the art as not to require mention herein and I have not deemed it necessary to illustrate any chemical supplying apparatus. The present invention does not have for its object the improvement upon the chemical feeding apparatus of the prior art, but does have for its object the provision of means for supplying fixed quantities of water to the settling tank from a prime supply which furnishes the water at an irregular rate, and on this account, as has been suggested, no chemical apparatus is illustrated, though I wish it to be understood that I do not limit myself to a prime supply furnishing the water at an irregular rate nor do I wish to restrict the use of my apparatus to determining the flow of water.

I claim:—

1. Apparatus of the class described including a fluid-receiving tank, a supply tank therefor, means for governing flow to the receiving tank, a shaft serving by its rotation to govern said means, an arm fixed between its ends upon said shaft, a weighted arm rotatably mounted between its ends, a float supported by the liquid in the supply tank and changed in position upon changes in the liquid level and serving to move the weighted arm so as to cause the same to fall in one direction when the float has been raised and in the alternative direction when the float has been lowered, said weighted arm being adapted for engagement with the other arm upon one side or the other of the connection of the other arm with said shaft, whereby said shaft is rotated in different directions to effect control of the means that govern the flow to the receiving tank, a swinging discharge pipe for conveying fluid from the supply tank, and means for swinging said pipe governed by float mechanism within the supply tank to maintain the head upon the liquid flowing through the pipe substantially constant.

2. Apparatus of the class described including a fluid-receiving tank, a supply tank therefor, means for governing flow to the receiving tank, a shaft serving by its rotation to govern said means, an arm fixed between its ends upon said shaft, a weighted arm rotatably mounted between its ends, a float supported by the liquid in the supply tank and changed in position upon changes in the liquid level and serving to move the weighted arm so as to cause the same to fall in one direction when the float has been raised and in the alternative direction when the float has been lowered, said weighted arm being adapted for engagement with the other arm upon one side or the other of the connection of the other arm with said shaft, whereby said shaft is rotated in different directions to effect control of the means that govern the flow to the receiving tank, the connection of the float with the weighted arm affording lost motion between the float and the weighted arm, whereby the weighted arm is not shifted to the position from which it may fall until the float has been either fully raised or fully depressed upon the liquid reaching either its upper level or lower level, whereby flow to the receiving tank is either fully permitted or is cut off, a swinging discharge pipe for conveying fluid from the supply tank, and means for swinging said pipe governed by float mechanism within the supply tank to maintain the head upon the liquid flowing through the pipe substantially constant.

3. Apparatus of the class described including a fluid-receiving tank, a supply tank therefor, means for governing flow to the receiving tank, a float supported by the liquid in the supply tank, mechanism governing said means and caused to operate by the float when the liquid that supports it reaches either its upper or lower level, whereby the flow to the receiving tank is either fully permitted or is cut off, a swinging discharge pipe for conveying fluid from the supply tank, and means for swinging said pipe governed by float mechanism within the supply tank to maintain the head upon the liquid flowing through the pipe substantially constant.

4. Apparatus of the class described including a fluid-receiving tank, a supply tank therefor, means for governing flow to the receiving tank, a float supported by the liquid in the supply tank, mechanism governing said means and having lost motion connection with said float, and caused to operate by the float when the liquid that supports it reaches either its upper or lower level, whereby the flow to the receiving tank is either fully permitted or is cut off, a swinging discharge pipe for conveying fluid from the supply tank, and means for swinging said pipe governed by float mechanism within the supply tank to maintain the head upon the liquid flowing through the pipe substantially constant.

In witness whereof, I hereunto subscribe my name this seventeenth day of Nov. A. D., 1908.

KENT W. BARTLETT.

Witnesses:
SALLY LOEHRER,
JACKSON REUTER.

---

Copies of this patent may be obtained for five cents each, by addressing the "Commissioner of Patents, Washington, D. C."